United States Patent Office 2,785,133
Patented Mar. 12, 1957

2,785,133

COMPOSITIONS FOR A METHOD OF WHITENING FINE FABRICS

Louis E. Craig, Easton, Pa., assignor to General Aniline & Film Corporation, New York, N. Y., a corporation of Delaware No Drawing. Application March 26, 1954,
Serial No. 419,107

6 Claims. (Cl. 252—152)

This invention relates to new compositions for improving the whiteness of fine fabrics to the method of whitening such fabrics and fabrics treated with said compositions.

The art of brightening or whitening fabrics by means of chemical compounds, for example, stilbenes, dibenzothiophenedioxides, dibenzimidazylethylenes, dibenzoxazolylethylenes, dibenzthiazolylethylenes, coumarins, benzidines, phenylenediamines, polyarylimidazolones, diarylpyrazolines, and the like, are well known. Such compounds are complex requiring costly syntheses and are high priced. In addition, such compounds contain amino and sulfonic acid groups, usually two of each, and as a result are not particularly substantive to fabrics made from synthetic fibers and are of limited utility for whitening such synthetic fabrics.

I have found that relatively inexpensive brightening compositions for fine fabrics are readily obtained by utilizing such compositions containing substituted or unsubstituted pyrrocolines, pyrimidazoles and imidazo[1,2-a]pyrimidines.

These compounds are characterized by the following general formulae:

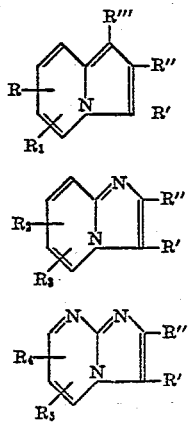

wherein R represents either hydrogen, halogen, e. g. chlorine, bromine or iodine, acyl, e. g., formyl, acetyl, propionyl, butyryl, etc., alkyl, e. g., methyl, ethyl, propyl, butyl, p-tertiarybutyl, isobutyl, etc., aryl, e. g., phenyl, tolyl, xylyl, cumyl, fluorenyl, bromophenyl, chlorophenyl, naphthyl, etc., aralkyl, e. g., benzyl, phenethyl, α-mesityl, etc., acylamino, e. g., formamido, acetamido, propionylamino, butyrylamino, benzamido, p-methylbenzamido, alkenyl, e. g., styryl, cinnamyl, etc., $R_1$ represents either hydrogen or alkyl of the same value as in R, $R_2$ represents either hydrogen, alkyl, e. g. methyl, ethyl, propyl, butyl, etc., alkoxy, e. g., methoxy, ethoxy, propoxy, isopropoxy, butoxy, etc., halogen, e. g., chlorine, bromine, iodine, etc., aryl, e. g., phenyl, tolyl, p-anisyl, tert-butyl phenyl, naphthyl, etc., phenylsulfonyl, p-tolylsulfonyl, sulfanilyl, or pyrrolidino group, $R_3$ represents either hydrogen, alkyl, e. g., methyl, ethyl, propyl, isopropyl, butyl, etc., halogen of the same value as in R, or aminoalkyl, e. g., aminomethyl, aminoethyl, aminopropyl or aminobutyl radical, $R_4$ represents either hydrogen, alkyl, alkoxy, aryl or halogen of the same value as in $R_2$, $R_5$ represents either hydrogen, halogen, e. g., chlorine, bromine, iodine, etc., hydroxy, alkyl, e. g., methyl, ethyl, propyl, butyl, etc., alkoxy, e. g., methoxy, ethoxy, propoxy, butoxy, etc., carbaloxy, e. g., carbomethoxy, carbethoxy, etc., sulfanilyl or aminophenylmercapto, e. g., p-aminophenylmercapto, etc., R' represents either hydrogen, alkyl, acyl, aryl and aralkyl of the same value as in R, carbalkoxy, e. g., carbomethoxy, carboethoxy, etc., or heterocyclic such as quinolyl, R" represents either aryl and substituted aryl, e. g., phenyl, aminophenyl, bromophenyl, chlorophenyl, biphenylyl, acenapthenyl, phenanthryl, trimethyl phenyl, dihydroxy phenyl, dimethoxy phenyl, dimethyl phenyl, hydrophenyl, methoxy phenyl, methyl mercapto phenyl, pyridyl phenyl, etc., or a heterocyclic group, e. g., thiophene, quinolyl, furyl, thiazolyl, pyridyl, cinnolinyl, dibenzofuryl, imidazolyl, etc., and R''' represents either alkyl, acyl, aryl or aralkyl of the same value as in R or a carbalkoxy group, e. g., carbomethoxy, carbethoxy, etc.

The foregoing compounds are readily prepared by well known methods involving the condensation reaction of α-haloketones with 2-picolines, 2-aminopyridines, and 2-aminopyrimidines, respectively. The reaction involved in the condensation may be readily exemplified by the following equations:

(1)
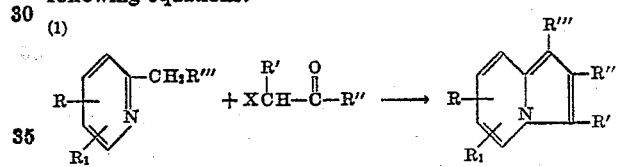

(2)
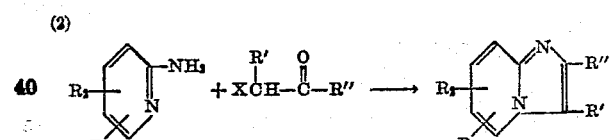

(3)
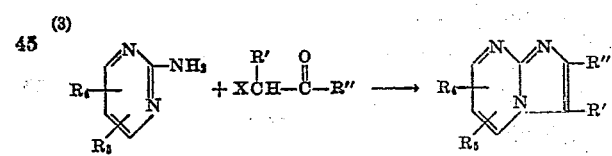

wherein R to $R_5$ and R' to R''' have the same values as above and wherein X represents a halogen, e. g., bromine, chlorine or iodine.

As illustrative examples of α-haloketones which are condensed with 2-picolines, 2-amino pyridines and 2-aminopyrimidines, the following may be mentioned:

3(and 5)-acenaphthenyl bromomethyl-ketone
Bromomethyl 5-chloroacenaphthenyl-ketone
Bromomethyl 2-(p-chlorophenyl)-4-quinolyl-ketone
Bromomethyl 6-chloro-4-quinolyl-ketone
Bromomethyl 2-dibenzothienyl-ketone
Bromomethyl 4-dibenzothienyl-ketone
Bromomethyl 2-ethoxy-4-quinolyl-ketone
Bromomethyl 2-furyl-ketone
Bromomethyl 2-hydroxy-4-methyl-5-thiazolyl-ketone
Bromomethyl 2-isopropyl-8-methyl-3-phenanthryl-ketone
Bromomethyl 4-methyl-5-imidazolyl-ketone
Bromomethyl 5-methyl-3-phenanthryl-ketone
Bromomethyl 2(and 3 and 9)-phenanthryl-ketone
Bromomethyl 2-pyridyl-ketone
Bromomethyl 3(and 4 and 8)-quinolyl-ketone
Chloromethyl 4-cinnolinyl-ketone Chloromethyl 4-methoxy-1-dibenzofuryl-ketone
Chloromethyl 3-indyl-ketone
Chloromethyl 2-methyl-3-indyl-ketone, and
Chloromethyl 3-methyl-2-indyl-ketone, as well as,
α-Bromo-p-tert.-butyl-acetophenone
α-Bromo-p-chloro-acetophenone
3-bromo-α-chloro-2,4,6-trimethyl-acetophenone
α-Bromo-2,6-dihydroxy-acetophenone
α-Bromo-4,5-dimethoxy-acetophenone
α-Bromo-3,4-dimethyl-acetophenone
α-Bromo-p-hydroxy-acetophenone
α-Bromo-p-methoxy-acetophenone
α-Bromo-o(and m and p)-methyl-acetophenone
α-Bromo-2-methyl-4-methylmercapto-acetophenone
o-Amino-α-chloro-acetophenone
α-Bromo-2,4,6-trimethyl-acetophenone
α-Chloro-3,4-dihydroxy-α-chloro-p-hexyl-acetophenone
α-Chloro-3-hydroxy-4-methoxy-acetophenone
α-Bromo-p-phenyl-acetophenone
α-Chloro-α-phenyl-acetophenone
α-Bromo-α-(p-bromophenyl)-acetophenone
α-Bromo-p-ethoxy-α-phenyl-acetophenone
α-Bromo-α-mesityl-acetophenone
α-Bromo-p-methoxy-α-phenylacetophenone
α-Bromo-α-phenylacetophenone
α-Bromo-p-chloro-α-phenylacetophenone
α-Bromo-α-(p-chlorophenyl)acetophenone
α-Bromo-α-(p-chlorophenyl)-p-methoxyacetophenone
α-Bromo-α-9-fluorenylacetophenone
α-Bromo-p-methyl-α-phenylacetophenone
α-Bromo-α-tolylsulfonylacetophenone
α-Bromo-p-chloro-α-2(and 4)-pyridylacetophenone
α-Bromo-2(and 4)-pyridylacetophenone, and
α-Bromo-α-(4-quinolyl)acetophenone As suitable examples, 2-substituted pyridines or 2-picolines, which may be condensed with α-haloketones to produce various pyrrocolines illustrated by general Formula 1, the following are illustrative:

5-acetamido-2-picoline (i. e. 5-acetamido-2-methylpyridine)
3(and 5)-acetyl-2-picoline
3(and 5)-benzamido-2-picoline
5(and 6)-butyl-2-picoline
3(and 4 and 5 and 6)ethyl-2-picoline
4(and 6)-phenyl-2-picoline
6-phenethyl-2-picoline
6-p-tolyl-2-picoline, and
5(and 6)-chloro-2-picolines and with substituted pyridines, such as, 2-(o-acetamidobenzyl)-4,6-diphenylpyridine
2-benzylpyridine
2-butylpyridine
2-ethylpyridine
2-phenethylpyridine
2,3,5-trimethylpyridine
2,3,6-trimethylpyridine As examples illustrative of 2-aminopyridines which may be condensed with α-haloketones to yield the various pyrimidazoles characterized by general Formula 2, the following may be mentioned:

2-amino-3-aminomethyl-6-methylpyridine
2-amino-3(and 4 and 5)-bromopyridine
2-amino-4-tert.-butylphenylpyridine
2-amino-5(and 6)-chloropyridine
2-amino-3-(1-methyl-2-pyrrolidyl)pyridine
2-amino-5-sulfanilylpyridine
2-amino-5(and 6)-ethoxypyridine
2-amino-4-chloro-5-methoxypyridine, and the like.

As examples of pyrimidines which are condensed with the α-haloketones to yield imidazoles[1,2-a]pyrimidines, the following are illustrative:

2-amino-4-p-anisylpyrimidine 2-amino-5-bromo-4-methylpyrimidine
2-amino-4-chloro-6-ethylpyrimidine
2-amino-4,6-dimethoxypyrimidine
2-amino-4,5-dimethylpyrimidine
2-amino-4-ethylpyrimidine
2-amino-4-phenylpyrimidine
2-amino-4-propylpyrimidine
2-amino-4-p-tolylpyrimidine
2-amino-4-(p-aminophenylmercapto)-6-methylpyrimidine
2-amino-4-chloro-6-ethylaminopyrimidine
2-amino-4-ethoxy-6-methylpyrimidine
2-amino-4-methoxypyrimidine
2-amino-4-methyl-6-sulfanilylpyrimidine
2-amino-4,5,6-trichloropyrimidine It is to be noted that α-haloketones other than those listed above can be very readily prepared by conventional methods from any aromatic or heterocyclic compounds which can be either haloacylated or acylated followed by the halogenation of the acetyl group.

In conducting the foregoing condensation reaction any one of the following references may be employed to yield the desired product. The following references relate to the preparation of numerous pyrrocolines (1) by the reaction of α-haloketones and 2-substituted pyridines:

Tschitschibabin, Ber., 60B, 1607 (1927)
Tschitschibabin and Stepanow, Ber., 62B, 1069 (1929)
Borrows, Holland and Kenyon, J. Chem. Soc., 1946, 1069; 1075; 1077; 1083
Borrows and Holland, J. Chem. Soc., 1947, 672
Buu-Hoi, et al., Rec. Trav. Chim., 68, 441, 781 (1949); 69, 1455 (1950) J. Org. Chem., 15, 123 (950)
Bull. Soc. Chim., 950, 489, 753

The following references describe the preparation of numerous pyrimidazoles by reaction of α-haloketones with 2-aminopyridines:

Tschitschibabin, Ber., 58, 1704 (1925); 59, 2048 (1926)
Campbell and McCall, J. Chem. Soc., 2411 (1951)
Matveev, Bull. Acad. Sci., U. S. S. R., Classe Sci. Math. Nat., Ser. Chim. 533 (1936); C. A. 31, 6654 (1937)
Kaye, Parris and Burlant, J. Am. Chem. Soc., 75, 746 (1953)
Buu-Hoi et al., Rec. Trav. Chim. 68, 441, 781 (1949); 69, 1455 (1950), Compt. Rend., 230, 489, 967 (1950)

Preparation of imidazo[1,2-a]pyrimidines from α-haloketones and 2-aminopyrimidines are described in the following references:

Otiai and Karii, J. Pharm. Soc. Japan 58, 1025 (1938); C. A. 33, 3791 (1939)
De Cat and Van Dormael, Bull. Soc. Chim. Belges, 59, 573 (1950) [C. A. 45 1047e (1951)]; 60, 69–75 (1951) [C. A. 46 5020e (1952)]
Natsukawa and Ban, J. Pharm. Soc. Japan, 71, 756 (1951); C. A. 46 8094a (1952)

The following are specific examples of the pyrrocolines, pyrimidazoles and imidazo[1,2-a]pyrimidines prepared in accordance with the methods given in the foregoing references and utilized in accordance with the present invention.

PYRROCOLINES

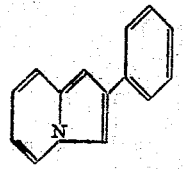

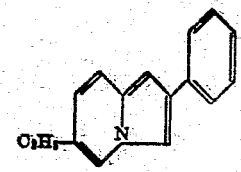

PYRROCOLINES—Continued
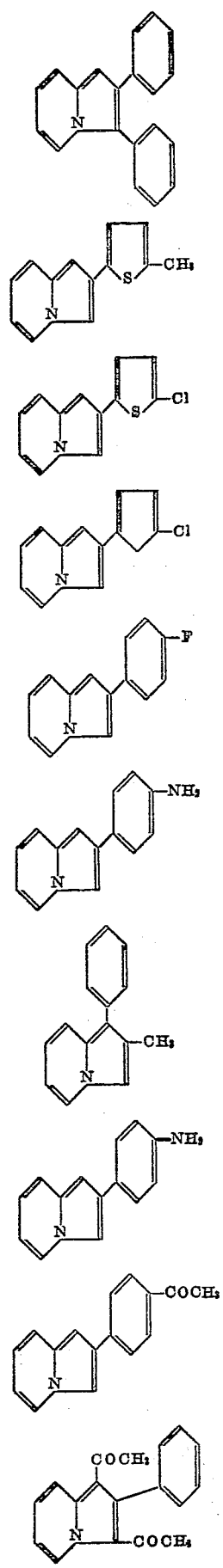
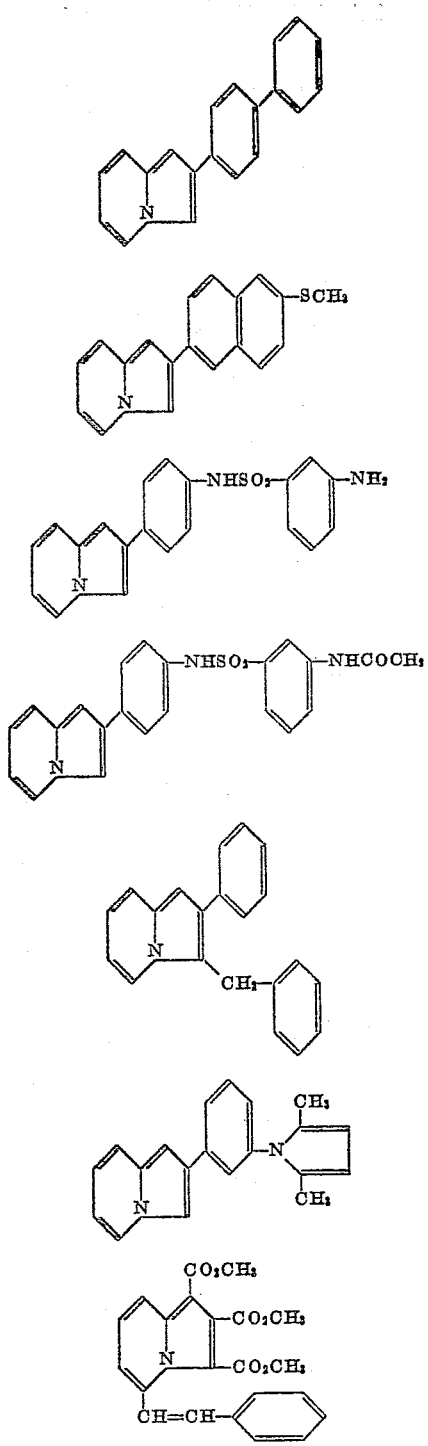
PYRIMIDAZOLES
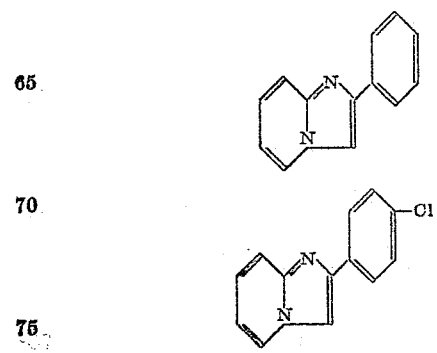

PYRIMIDAZOLES—Continued
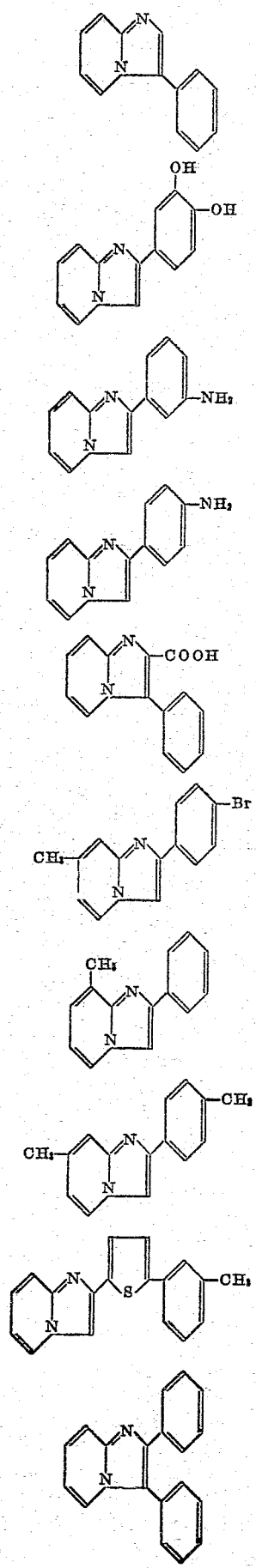
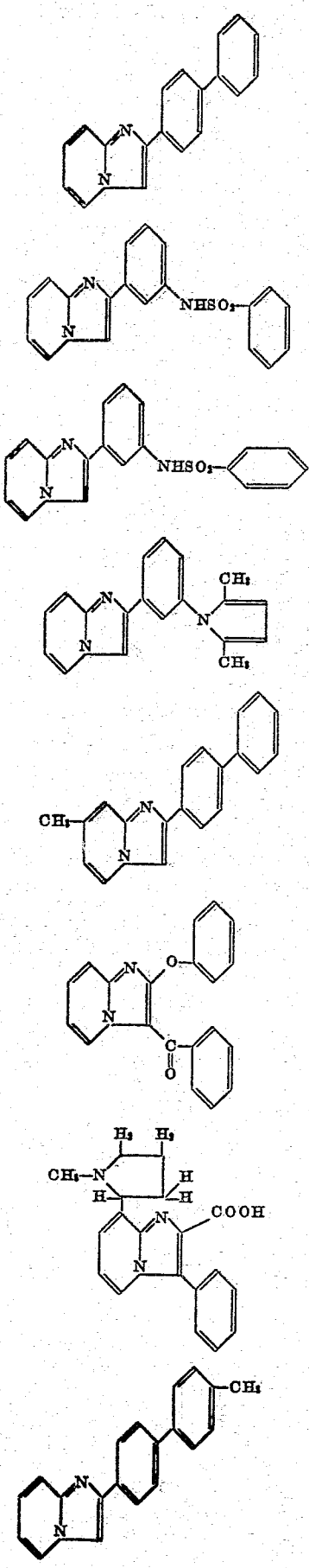

IMIDAZO[1,2-a]PYRIMIDINES

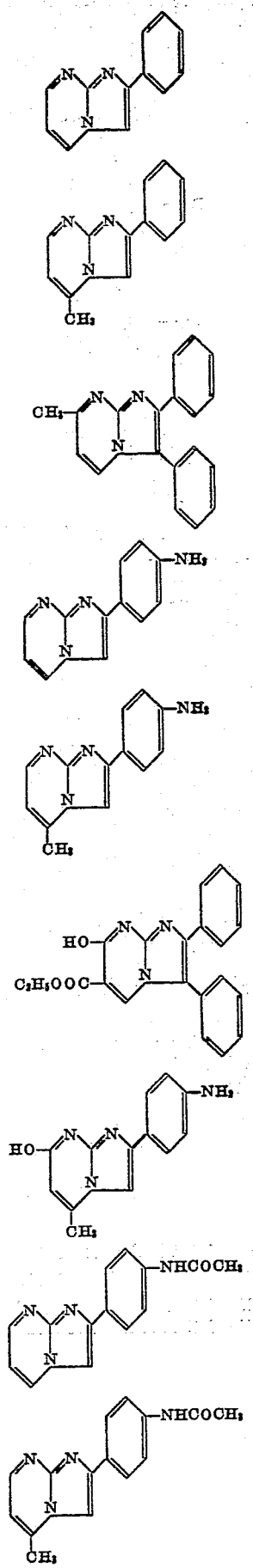

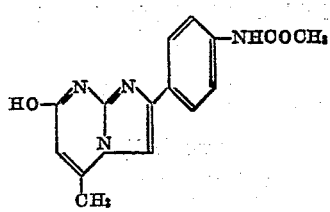

In preparing the whitening compositions in accordance with the present invention, I employ any one of the foregoing pyrrocolines, pyrimidazoles, imidazo[1,2-a]pyrimidines or mixtures thereof, dissolved in a water miscible organic solvent, for example, lower alcohols, e. g., methanol, ethanol, isopropanol and the like, acetone, dioxane and the like. The amount of such solvent or mixtures thereof may vary with the solubility of the brightening agents, or mixtures thereof. Such solutions preferably contain 0.5 to 20% by weight of the brightening agent or mixture. The solution thus prepared is added with agitation to hot water containing a small amount, usually from 0.1 to 2.5% by weight, of dispersing agent, which is preferably a detergent soap or a synthetic detergent, sodium stearate, sodium salt of tallow acids, long-chain alkyl quaternary ammonium salts, polyoxyethylated alkyl phenols, fatty alcohol sulfonates, alkylaryl sulfonates, N-acyl taurates and the like. All of these synthetic detergents are well known to those skilled in the art, and references to their preparation need not be discussed herein.

In employing the solution prepared as above, I have found that usually one-half ounce by volume of brightening solution may be added to about 3 to 5 gallons of hot water. The fabric to be brightened is placed in the hot water, agitated for a few minutes, rinsed in warm water and then dried. This operation is conveniently carried out during the regular laundering. The solution of brightening agent or mixtures thereof, which may be bottled in solution form, or packaged in dry form for use, is added to the hot water containing soap or synthetic detergent during regular laundering operations.

Such solutions or powders are especially suitable for whitening fine fabrics containing or consisting of nylon, wool, acetate rayon or silk. They are also suitable for whitening fabrics made from synthetic fibers, such as those sold under the trade names of "Dacron," "Orlon," "Dynel," "Acrilan," "Saran" and the like.

A preferred embodiment of the present invention involves the distribution of the brightening agent or mixture in the soap or synthetic detergent. Thus, for example, solutions of the brightening agents or mixtures thereof, prepared as above, are added to aqueous solutions of slurries of soap or synthetic detergent, preferably during their manufacture, and isolated in the usual way, such as, for example, by spray drying. The soap or synthetic detergent containing the brightening agent or mixture thereof is used in the usual laundering procedure, or may be added to a hot water bath through which the fabrics can be run during manufacture and processing. The following examples describe the preparation of the brightening compositions and the treatment of fabrics therewith. It is to be understood that these examples are merely inserted for the purpose of illustration, and are not to be construed as limiting the scope of the invention claimed. All parts given are by weight unless otherwise specified.

Example I

About 0.5 part by weight of 2-phenylpyrrocoline was dissolved in 100 parts of ethanol. About 1 part by weight of this solution was added to 50 parts of hot water containing 0.2–0.3% by weight of soap flakes sold under the trade name of Arctic Crystal Soap Flakes. A swatch of acetate rayon cloth was then stirred for a few minutes in this aqueous dispersion, removed, rinsed in hot water, and dried. The fabrics showed a very bright fluorescence under ultraviolet light and was whiter in daylight than the untreated cloth.

Similar application to nylon, silk, and wool resulted in whitening of the fabric.

Example II

About 1 part by weight of a solution of 5 parts of 2-phenylpyrimidazole in 100 parts of isopropanol was added to 50 parts of hot water containing 0.2-0.3% by weight of a synthetic detergent sold under the brand name of Tide. A swatch of acetate rayon was treated as in Example I. The fabric was of improved whiteness and showed a strong blue fluorescence under ultraviolet light.

Similar application of the brightening agent to viscose rayon resulted in improved whiteness.

Example III

About 1 part by weight of a solution of 0.5 part of 2-phenyl imidazo[1,2-a]pyrimidine in 100 parts of ethanol was added to 50 parts of hot water containing 0.2-0.3% by weight a synthetic detergent of the alkyl phenol-ethylene oxide type. A swatch of wool treated as in Example I showed a very bright fluorescence under ultraviolet light and was of improved whiteness.

Swatches of silk, acetate rayon, nylon, Dacron, and Acrilan were treated in a similar manner. All fabrics showed improved whiteness.

Example IV

A swatch of acetate rayon was treated with a brightening composition prepared as in Example I except that 2,3-diphenyl pyrrocoline was used in place of 2-phenyl pyrrocoline. The fabric was of improved whiteness. Wool and nylon treated in this manner also showed improved whiteness.

Example V

To a stirred mixture of 50 parts of water and 50 parts of soap flakes sold under the trade name Arctic Crystal Soap Flakes was added a solution of 2.5 parts of 2-phenyl-6-ethylpyrrocoline in 25 parts of ethanol. After stirring the mixture well for several minutes, the water and ethanol were removed by distillation under slightly reduced pressure. About 1 part of the resulting soap flakes was added to 500 parts of hot water. A large swatch of acetate rayon was added, stirred for several minutes, removed, rinsed with hot water, and dried. The fabric showed a very bright blue fluorescence under ultraviolet light and was of improved whiteness.

Wool, silk, and nylon were also treated in this manner. All were of improved whiteness.

Example VI

To a stirred mixture of 50 parts of water and 50 parts of synthetic detergent sold under the trade name of Tide was added a solution of 2-phenylpyrrocoline in 25 parts of ethanol. The water and ethanol were removed under slightly reduced pressure. A swatch of nylon was treated with the resulting detergent containing the brightening agent by the procedure of Example V to give improved whiteness. The whiteness of acetate rayon, wool, and Orlon was also improved by similar treatment.

I claim:

1. A composition of matter for brightening white organic textile fabrics comprising an aqueous emulsion containing 0.1-2.5% by weight of an organic water soluble synthetic detergent and from 0.0005-0.1% by weight of at least one brightening agent selected from the class consisting of those of the following formulae:

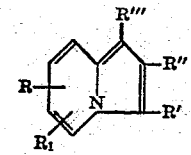

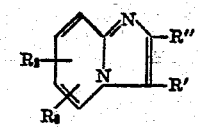

and

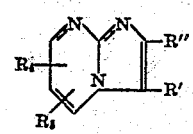

wherein R represents a member selected from the class consisting of hydrogen, halogen, acyl, acylamino, alkyl, alkenyl, aryl, and aralkyl groups, $R_1$ represents a member selected from the class consisting of hydrogen and alkyl groups, $R_2$ represents a member selected from the class consisting of hydrogen, alkyl, alkoxy, halogen, aryl, phenylsulfonyl, p-tolylsulfonyl, sulfanilyl and pyrrolidino groups, $R_3$ represents a member selected from the class consisting of hydrogen, alkyl, aminoalkyl and halogen groups, $R_4$ represents a member selected from the class consisting of hydrogen, alkyl, alkoxy, aryl and halogen groups, $R_5$ represents a member selected from the class consisting of hydrogen, alkyl, alkoxy, carbalkoxy, halogen, hydroxy, aminophenylmercapto and sulfanilyl groups, R' represents a member selected from the class consisting of hydrogen, acyl, alkyl, aryl, aralkyl, carbalkoxy and quinolyl groups, R'' represents a member selected from the class consisting of aryl and heterocyclic radicals, and R''' represents a member selected from the class consisting of alkyl, aryl, aralkyl, acyl, and carbalkoxy groups.

2. A composition of matter according to claim 1, wherein the brightening agent is 2-phenylpyrrocoline.

3. A composition of matter according to claim 1, wherein the brightening agent is 2-phenylpyrimidazole.

4. A composition of matter according to claim 1, wherein the brightening agent is 2-phenylimidazo[1,2-a]pyrimidine.

5. A composition of matter according to claim 1, wherein the brightening agent is 2,3-diphenylpyrrocoline.

6. A composition of matter according to claim 1, wherein the brightening agent is 2-phenyl-6-ethylpyrrocoline.

References Cited in the file of this patent

UNITED STATES PATENTS

| | | |
|---|---|---|
| 2,639,990 | Kendall | May 26, 1953 |
| 2,649,385 | Kendall | Aug. 18, 1953 |